United States Patent
Kang (10) Patent No.: US 7,670,539 B2
(45) Date of Patent: Mar. 2, 2010

(54) METHOD AND APPARATUS OF INJECTION MOLDING USING A HEAT-TRANSFER ENHANCING LAYER

(76) Inventor: Myung-Ho Kang, #201 Gumdong Family Town, 181-400, Sadang-dong, Dongjak-gu, Seoul 156-090 (KR)

( * ) Notice: Subject to any disclaimer, the term of this patent is extended or adjusted under 35 U.S.C. 154(b) by 178 days.

(21) Appl. No.: 11/861,136

(22) Filed: Sep. 25, 2007

(65) Prior Publication Data

US 2008/0054527 A1    Mar. 6, 2008

Related U.S. Application Data

(63) Continuation of application No. PCT/KR2006/001827, filed on May 16, 2006.

(30) Foreign Application Priority Data

Aug. 30, 2005    (KR)    ........................ 10-2005-0080158

(51) Int. Cl.
*B29C 45/72* (2006.01)
(52) U.S. Cl. ............................ 264/328.14; 264/328.16; 425/547; 425/548; 425/552
(58) Field of Classification Search ................. 425/547, 425/548, 552; 264/328.14, 328.16
See application file for complete search history.

(56) References Cited

U.S. PATENT DOCUMENTS

| | | | |
|---|---|---|---|
| 2,828,509 A * | 4/1958 | Smucker et al. | ............. 425/552 |
| 4,017,242 A * | 4/1977 | Mercer | ........................ 425/549 |
| 5,569,474 A * | 10/1996 | Kitaichi et al. | ............... 425/547 |
| 5,656,234 A | 8/1997 | Kaneishi et al. | |
| 5,705,793 A * | 1/1998 | Kitaichi et al. | ............... 425/547 |
| 6,544,024 B1 | 4/2003 | Yim | |
| 2003/0215540 A1 | 11/2003 | Asai | |
| 2008/0054529 A1 | 3/2008 | Kang | |

FOREIGN PATENT DOCUMENTS

| | | | |
|---|---|---|---|
| JP | 56-137942 A | 10/1981 |
| JP | 60-149424 A | 8/1985 |
| JP | 63-030213 A | 2/1988 |
| JP | 05-016742 A | 1/1993 |

(Continued)

OTHER PUBLICATIONS

International Search Report dated Oct. 9, 2006 in PCT Application No. PCT/KR2006/001827 which is the parent application of this application, in 3 pages.

(Continued)

*Primary Examiner*—Tim Heitbrink
(74) *Attorney, Agent, or Firm*—Knobbe Martens Olson & Bear LLP (57) ABSTRACT

The injection molding apparatus includes a cavity mold formed with a cavity surface for defining a cavity in which a molten injection material is injected, a core mold formed with a core surface for defining the cavity upon engagement with the cavity mold and installed to be movable forward and backward to open or close the cavity by guidance of a guide pin, an injection unit for injecting a material into the cavity during an injection process, and an injection controller for controlling a hydraulic cylinder to move the core mold forward or backward and the injection unit to inject the material into the cavity.

21 Claims, 7 Drawing Sheets

FOREIGN PATENT DOCUMENTS

| | | |
|---|---|---|
| JP | 08-090624 A | 4/1996 |
| JP | 08-238648 A | 9/1996 |
| KR | 10-1999-0041963 A | 6/1999 |
| KR | 10-2003-0064484 A | 8/2003 |
| KR | 10-2003-0082487 A | 10/2003 |
| KR | 10-2003-0089426 A | 11/2003 |

OTHER PUBLICATIONS

Written Opinion dated Oct. 9, 2006 in PCT Application No. PCT/KR2006/001827, which is the parent application of this application, in 4 pages.

Office Action dated Jun. 30, 2008 of related U.S. Appl. No. 11/860,414.

* cited by examiner

METHOD AND APPARATUS OF INJECTION MOLDING USING A HEAT-TRANSFER ENHANCING LAYER

CROSS-REFERENCE TO RELATED PATENT APPLICATIONS

This application is a continuation application under 35 U.S.C. § 365(c) of International Application No. PCT/KR2006/001827, filed May 16, 2006 designating the United States. International Application No. PCT/KR2006/001827 was published in English as WO2007/026987 A1 on Mar. 8, 2007. This application further claims the benefit of the earlier filing dates under 35 U.S.C. § 365(b) of Korean Patent Application No. 10-2005-0080158 filed Aug. 30, 2005. This application incorporates herein by reference the International Application No. PCT/KR2005/0080158 including the International Publication No. WO2007/026987 A1 and the Korean Patent Application No. 10-2005-0080158 in their entirety.

Further, this application is related to application Ser. No. 11/860,414 filed Sep. 24, 2007, which is incorporated herein by reference in its entirety.

BACKGROUND

The present disclosure relates to injection molding, and more particularly, to heating and cooling an injection molding apparatus.

The injection molding of a synthetic resin or metal is a manufacturing method of injecting a molten synthetic resin or metal between a stationary mold (a cavity mold) with a cavity and a movable mold (a core mold) with a core and then cooling the injected synthetic resin or metal to obtain a molded product in the form of a cavity.

SUMMARY

One aspect of the invention provides an apparatus for injection molding, which comprises: a first mold comprising a first cavity surface; and a second mold comprising a heating plate comprising a second cavity surface opposing the first cavity surface, wherein the first and second cavity surfaces in combination are configured to define a molding cavity with or without an additional surface, a cooling plate movable relative to the heating plate between a first position and a second position, wherein in the first position the cooling plate contacts the heating plate, and a heat-transfer enhancing layer integrated with either of the heating plate and the cooling plate so as to be interposed between the heating plate and the cooling plate, wherein the heat-transfer enhancing layer is formed of a material other than that of a portion of the cooling plate or the heating plate with which the heat-transfer enhancing layer is integrated, wherein the heat-transfer enhancing layer is configured to improve a heat-transfer contact between the heating plate and the cooling plate when the cooling plate is in the first position.

In the foregoing apparatus, the heat-transfer enhancing layer may be integrated with the cooling plate, wherein the heat-transfer enhancing layer may comprise a surface facing the heating plate, wherein the surface may contacts the heating plate when the cooling plate is in the first position, while not contacting the heating plate when the cooling plate is in the second position. The heat-transfer enhancing layer may be integrated with the heating plate, wherein the heat-transfer enhancing layer may comprise a surface facing the cooling plate, wherein the surface may contact the cooling plate when the cooling plate is in the first position, while not contacting the cooling plate when the cooling plate is in the second position. The material of the heat-transfer enhancing layer may be softer than that of the material of the portion of the heating plate or the cooling plate. The heat-transfer enhancing layer may comprise at least one metal selected from the group consisting of gold, silver, copper, tin, lead and aluminum. The heat-transfer enhancing layer may comprise a grease layer coated on a surface of the cooling plate. The heat-transfer enhancing layer may comprise a grease layer coated on a surface of the heating plate.

Still in the foregoing apparatus, the heating plate may further comprise an electric heater embedded therein. The first mold may be movable relative to the cooling plate and further movable relative to the heating plate. The first mold may comprise a passage configured to flow a moldable material toward the cavity. The first mold may comprise a second heating plate comprising the first cavity surface, a second cooling plate movable relative to the first heating plate between a third position and a fourth position, wherein in the third position the second cooling plate contacts the second heating plate, and a second heat-transfer enhancing layer integrated with either of the second heating plate and the second cooling plate so as to be interposed between the second heating plate and the second cooling plate, wherein the second heat-transfer enhancing layer is formed of a material other than that of a portion of the second cooling plate or the second heating plate with which the second heat-transfer enhancing layer is integrated, wherein the second heat-transfer enhancing layer is configured to improve a heat-transfer contact between the second heating plate and the second cooling plate when the second cooling plate is in the third position.

Another aspect of the invention provides a method of injection molding, the method comprising: providing an injection molding apparatus comprising a first mold comprising a first cavity surface, a second mold comprising a heating plate and a cooling plate, wherein the heating plate comprises a second cavity surface opposing the first cavity surface, and a heat-transfer enhancing layer integrated with either of the second heating plate and the second cooling plate so as to be interposed between the heating plate and the cooling plate, wherein the heat-transfer enhancing layer is formed of a material other than that of a portion of the cooling plate or the heating plate with which the heat-transfer enhancing layer is integrated; moving the heating plate relative to the first mold so as to form a molding cavity between the first and second cavity surfaces with or without an additional surface; generating heat in the heating plate; injecting a moldable material into the molding cavity; moving the cooling plate relative to the heating plate such that the heat-transfer enhancing layer contacts the other of the heating plate and the cooling plate, thereby improving a heat-transfer contact between the heating plate and the cooling plate; and cooling the cooling plate so as to enhance heat-transfer from the heating plate to the cooling plate.

In the foregoing method, the heat-transfer enhancing layer may be integrated with the cooling plate. The heat-transfer enhancing layer may be integrated with the heating plate. The material of the heat-transfer enhancing layer is softer than that of the material of the portion of the heating plate or the cooling plate. The heat-transfer enhancing layer may comprise at least one metal selected from the group consisting of gold, silver, copper, tin, lead and aluminum. The heat-transfer enhancing layer may comprise a grease layer coated on a surface of the cooling plate. The heat-transfer enhancing layer may comprise a grease layer coated on a surface of the heating plate. The method may further comprise moving the cooling plate away from the heating plate after injecting the moldable material. The heating plate may comprise an electrical heater embedded therein.

One aspect of the present invention is to provide an injection molding apparatus having a heating and cooling means, in which a mold is kept at a suitable temperature to maintain the flowability and transferability of an injected molten material and is then cooled rapidly during and after an injection process to shorten a cycle time for the injection molding, and a controlling method thereof. That is, this aspect of the present invention is to provide an injection molding apparatus and a controlling method thereof capable of solving a conflicting problem in that it takes much time to cool the mold and thus the cycle time for the injection molding is increased when the temperature of the mold is increased, whereas the flowability and transferability may be deteriorated when the size of the mold is reduced to rapidly cool the mold.

Another aspect of the present invention is to provide an injection molding apparatus capable of manufacturing a high quality injection-molded product without deformation and also of reducing a cycle time by allowing each of regions on a mold surface to be maintained at a desired temperature to control a cooling rate of the injection-molded product, and a controlling method thereof.

One aspect of the invention provides an injection molding apparatus, which comprises a cavity mold formed with a cavity surface for defining a cavity in which a molten injection material is injected, a core mold formed with a core surface for defining the cavity upon engagement with the cavity mold and installed to be movable forward and backward to open or close the cavity by guidance of a guide pin, an injection unit for injecting a material into the cavity during an injection process, and an injection controller for controlling a hydraulic cylinder to move the core mold forward or backward and the injection unit to inject the material into the cavity. Further, the core mold is divided into a thinner intermediate core mold plate having the core surface and a thicker core mold support plate, and includes a guide pin extending from the core mold support plate to be inserted into a first guide hole formed in the cavity mold upon movement of the core mold toward the cavity mold and fitted through the intermediate core mold plate to allow the intermediate core mold plate to move only forward and backward, and a first elastic member installed between the intermediate core mold plate and the core mold support plate to allow the intermediate core mold plate and the core mold support plate to be separated from each other by means of elastic force when the core mold moves backward to open the cavity.

In addition, the injection molding apparatus further comprises a first heating means installed to a parting surface of the intermediate core mold plate to heat the intermediate core mold plate, a first cooling means for cooling the core mold support plate, and a mold temperature controller for controlling the first heating and cooling means to control a temperature of the intermediate core mold plate during the injection process. Particularly, since the injection molding apparatus is configured such that the injection controller controls the hydraulic cylinder to allow the core mold to move forward and backward and the mold temperature controller controls the temperature of the intermediate core mold plate, injection molding works are automated. Therefore, the number of workers can be reduced and the productivity can also be improved.

In the injection molding apparatus, the core mold, which serves as a movable mold installed to be movable relative to the cavity mold, is divided into the thinner intermediate core mold plate and the thicker core mold support plate. Further, the intermediate core mold plate is heated by the heating means to be kept at a temperature suitable for the injection molding before engagement with the core mold support plate, and the core mold support plate is cooled enough to rapidly cool the intermediate core mold plate when coming into contact with the intermediate core mold plate. During the injection process, the core mold support plate is moved toward the cavity mold such that the intermediate core mold plate is pressed to come into close contact with the cavity mold, and then, the operation of the heating means is stopped and the intermediate core mold plate contacted with the core mold support plate is rapidly cooled after a molten material has been completely injected. Thus, the core surface is kept at a suitable temperature to ensure excellent flowability and transferability when the molten material is being injected, but the mold can be rapidly cooled immediately after the completion of injection. Thus, a cycle time of the injection molding can be shortened.

The injection molding apparatus further comprises a heat transfer member installed to a surface of the intermediate core mold plate facing the core mold support plate or a surface of the core mold support plate facing the intermediate core mold plate to rapidly cool the heated intermediate core mold plate. Preferably, the heat transfer member is made of soft metal with hardness less than the core mold, and is made of a metal selected from the group consisting of gold, silver, copper, tin, lead and aluminum, or an alloy thereof. More preferably, the heat transfer member contains a heat transfer material having a dissolution temperature of 180° C. or above and is lubricating grease. Therefore, since the heat transfer member is installed between the intermediate core mold plate and the core mold support plate which are separated from each other, the heated intermediate core mold plate can be rapidly cooled. Further, since impact occurring when the intermediate core mold plate and the core mold support plate collide against each other is alleviated, the durability of the injection molding apparatus can be further enhanced.

The injection molding apparatus is configured in such a manner that the first heating means includes an electric heater inserted into a groove formed in the parting surface of the intermediate core mold plate, and the first cooling means includes a coolant pipe installed in the core mold support plate to allow a coolant to flow through the coolant pipe. A copper member filled in a space between the electric heater and the groove to facilitate heat transfer is further provided. Further, the first elastic member is a coil spring through which the guide pin is inserted and a circular hole with a predetermined depth is formed at an outer peripheral region of the core mold support plate, to which the guide pin is fixed, to allow the coil spring to be fully inserted therein when the core mold support plate moves forward. A temperature sensor installed in the intermediate core mold plate to measure the temperature of the intermediate core mold plate is further provided. Furthermore, a plurality of electric heaters each capable of independently controlling its amount of heat are provided.

In the injection molding apparatus, the cavity mold is divided into a thinner intermediate cavity mold plate formed with a cavity surface and a thicker cavity mold support plate formed with a second guide hole. The cavity mold includes a hollow guide cylinder having one end fixed through the intermediate cavity mold plate and the other end fitted into the second guide hole of the cavity mold support plate to allow the intermediate cavity mold plate to move only forward and backward, and a second elastic member installed between the intermediate cavity mold plate and the cavity mold support plate to allow the intermediate cavity mold plate and the cavity mold support plate to be separated from each other by means of elastic force when the core mold moves backward to open the cavity. The injection molding apparatus includes a second heating means installed to a parting surface of the intermediate cavity mold plate to heat the intermediate cavity mold plate and a second cooling means for cooling the cavity mold support plate.

If the cavity mold as well as the core mold is divided into the intermediate cavity mold plate and the cavity mold support plate, the intermediate cavity mold can be heated to be kept at a temperature suitable for injection molding before engagement with the cavity mold support plate and the cavity mold support plate can be cooled enough to rapidly cool the intermediate core mold plate when coming into contact with the intermediate core mold plate. That is, the molten injection molding material is completely injected in a state where the intermediate core mold plate, the intermediate cavity mold plate and the cavity mold support plate are brought into close contact with one another by moving the core mold support plate toward the cavity mold, and also while all the cavity surfaces are kept at a temperature suitable for the injection process by stopping the heating of the first and second heating means. After the injection process has been completed, the whole cavity can be rapidly cooled. Therefore, when the molten material is injected, the cavity and core surfaces are kept at the suitable temperatures to ensure superior flowability and transferability. Further, since the mold can be rapidly cooled just after the injection has been completed, a cycle time of the injection molding process can be shortened.

In addition, in order to enhance a cooling effect of the intermediate cavity mold, it is preferred that the parting surfaces of the cavity mold support plate and the intermediate cavity mold plate be completely brought into close contact with each other during the cooling process. That is, a coil spring is used as the elastic member such that a hollow cylinder can be inserted, and a large-diameter portion with a predetermined depth is preferably formed in the second guide hole of the cavity mold support plate to allow the coil spring to be completely inserted therein when the intermediate cavity mold plate moves backward. In addition, a hollow space of the guide cylinder is used as the first guide hole such that the guide pin can be inserted into the hollow space of the guide cylinder when the core mold moves toward the cavity mold, thereby advantageously simplifying the configuration.

In addition, in the injection molding apparatus, each of the first and second heating means utilizes an electric heater capable of easily controlling an amount of heat. Particularly, the first and second heating means are installed into the grooves formed in the parting surfaces of the molds to effectively transfer the generated heat directly to the intermediate core and cavity mold plates in a state where they are brought into contact with the intermediate mold plates. In addition, in order to promote heat transfer by increasing a contact area between the intermediate core mold plate and the core mold support plate, copper is preferably filled in a space between the groove and the electric heater inserted into the groove.

A temperature sensor may also be installed to the intermediate core mold plate to control an amount of heat of the electric heater such that the temperature of the core mold can be kept within a predetermined range. Each of the first and second cooling means includes a coolant pipe inserted into the core mold support plate such that a coolant can flow through the coolant pipe. In addition, each of the electric heaters may use a single heat wire, but a plurality of electric wires each capable of independently controlling an amount of heat are used to control the temperatures of various regions on the cavity or core surface. If the temperature is independently controlled for every region, a cooling rate of an injection molded product can be controlled and the deformation caused by residual stress can also be reduced such that a high quality molded product can be produced. Further, a cycle time can be shortened due to a fast cooling rate of the mold, and thus, the productivity can be improved.

Another aspect of the present invention provides a method of controlling an injection molding apparatus which includes a cavity mold formed with a cavity surface for defining a cavity in which a molten injection material is injected, a core mold formed with a core surface for defining the cavity upon engagement with the cavity mold and installed to be movable forward and backward to open or close the cavity by guidance of a guide pin, the core mold being divided into an intermediate core mold plate and a core mold support plate, an injection unit for injecting a material into the cavity during an injection process, and an injection controller for controlling a hydraulic cylinder to move the core mold forward or backward and the injection unit to inject the material into the cavity, a first heating means installed to a parting surface of the intermediate core mold plate to heat the intermediate core mold plate, a first cooling means for cooling the core mold support plate, and a mold temperature controller for controlling the first heating and cooling means to control a temperature of the intermediate core mold plate during the injection process.

The method comprises the steps of operating the hydraulic cylinder to allow the core mold to be engaged with the cavity mold; operating the first heating means, simultaneously when the hydraulic cylinder is started, to heat the intermediate core mold plate; stopping the operation of the first heating means to stop heating the intermediate core mold plate when a signal detected from a temperature sensor installed to the intermediate core mold plate reaches a predetermined heating temperature; injecting a molten material from the injection unit into the cavity at the same time when the operation of the first heating means is stopped; bringing the core mold support plate mounted with a coolant pipe into close contact with the intermediate core mold plate to cool the intermediate core mold plate simultaneously when the material starts being injected; separating the intermediate core mold plate and the core mold support plate from each other to stop cooling the intermediate core mold plate when the signal detected from the temperature sensor installed to the intermediate core mold plate reaches the predetermined cooling temperature; and operating the hydraulic cylinder to allow the core mold to be disengaged from the cavity mold.

BRIEF DESCRIPTION OF THE DRAWINGS

FIG. 5($a$) is a schematic view showing an arrangement of the electric heater of the intermediate core mold plate according to an embodiment of the present invention.

FIG. 5(b) is a schematic view showing another arrangement of the electric heater of the intermediate core mold plate according to an embodiment of the present invention.

DETAILED DESCRIPTION OF EMBODIMENTS

Hereinafter, embodiments of the present invention will be described in detail with reference to the accompanying drawings.

In the injection molding, it is preferred that the mold have the same temperature as the molten material, if possible, when the molten material is injected. The reason is that the flowability of the injected material and the transferability of a pattern onto a cavity surface can be improved and the deformation caused by residual stress after the molten material is hardened can also be reduced. Further, it is preferred that the mold have a lower temperature after the molten material has been completely injected so that the injected material can be rapidly cooled and a cycle time for the injection molding can also be shortened, thereby enhancing its productivity.

However, if the mold is beforehand heated to increase its temperature, the flowability and transferability are enhanced but it takes long time to cool the mold. Thus, a cycle time for the injection molding may be increased. On the other hand, in a case where the volume of the mold is decreased such that the mold can be rapidly cooled to shorten a cycle time for the injection molding, the stiffness or rigidity of the mold may be weakened. Thus, a molded product may be deformed or its durability may be deteriorated.

Figure 1:
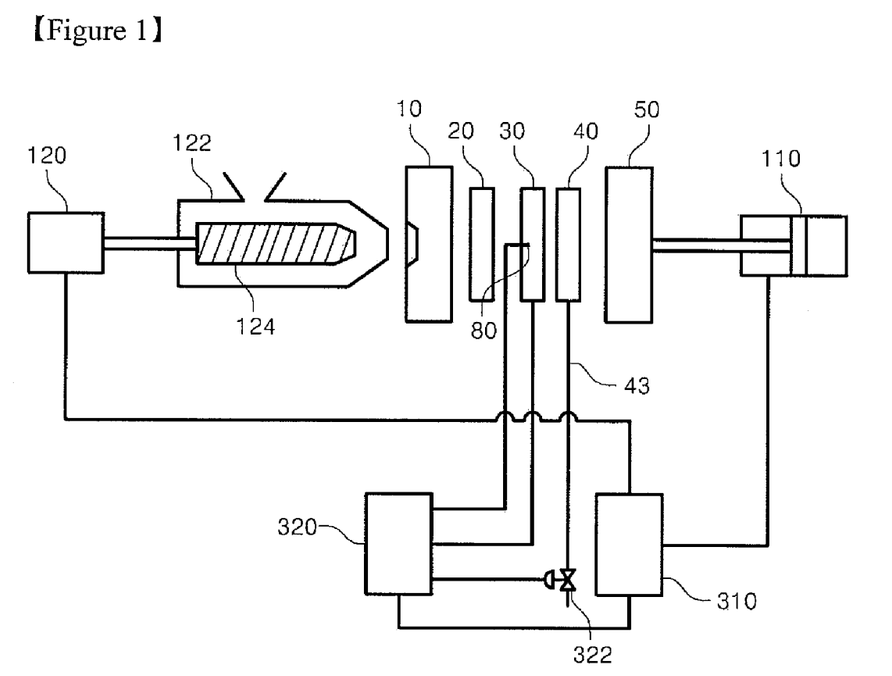
FIG. 1 is a block diagram schematically showing an injection molding apparatus according to an embodiment of the present invention.
Figure 2:
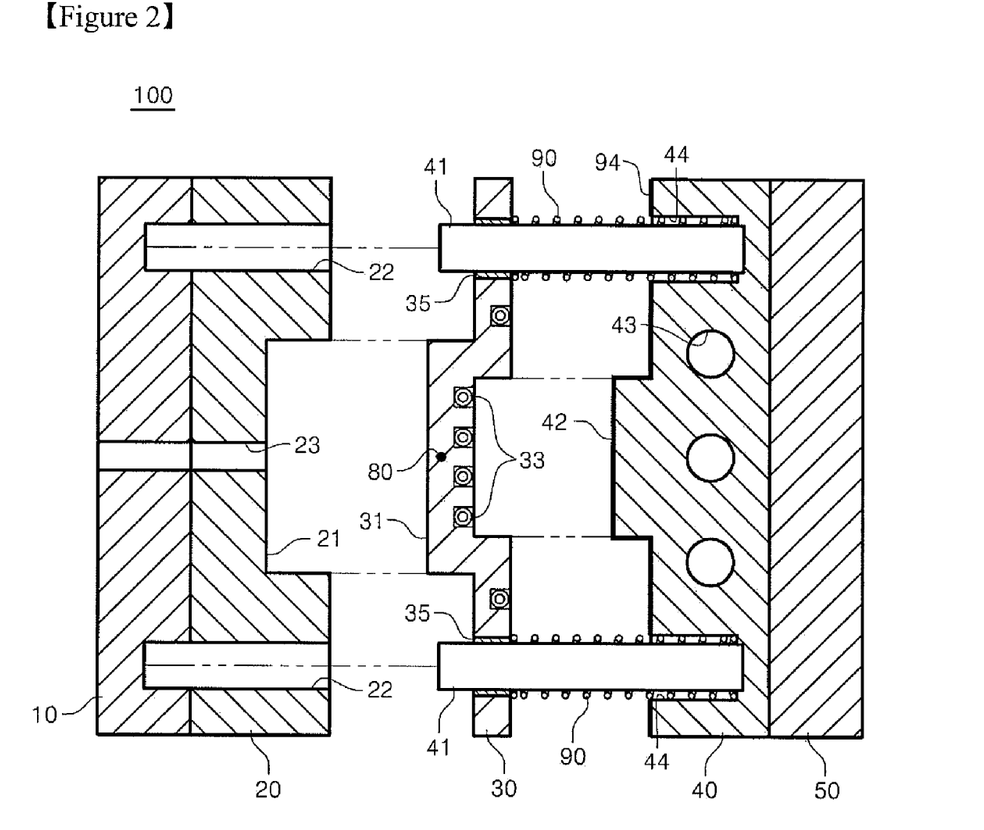
FIG. 2 is a schematic view showing an open state of the molds of the injection molding apparatus according to an embodiment of the present invention.
Figure 3:
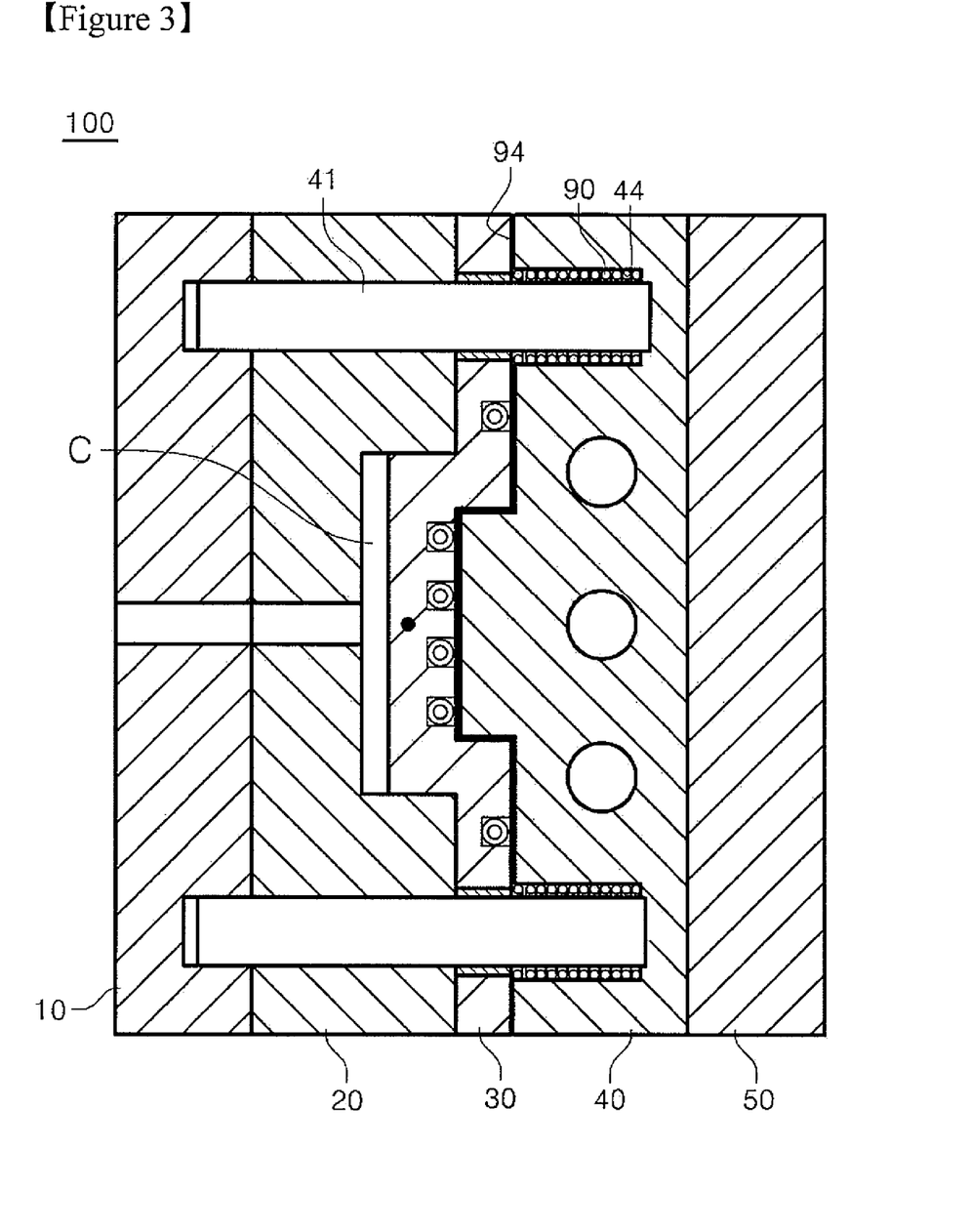
FIG. 3 is a schematic view showing a closed state of the molds of the injection molding apparatus according to an embodiment of the present invention.
Figure 4:
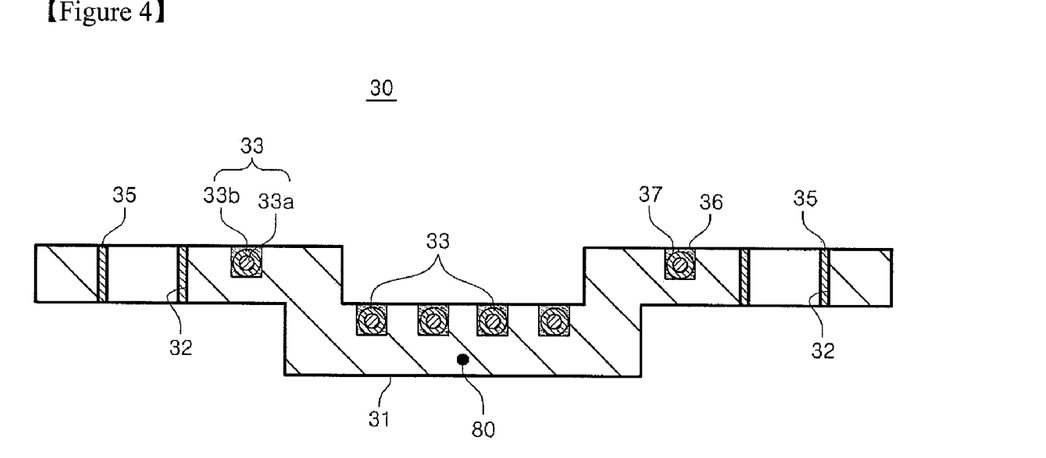
FIG. 4 is a detailed view showing an electric heater of an intermediate core mold plate according to an embodiment of the present invention.
Figure 5:
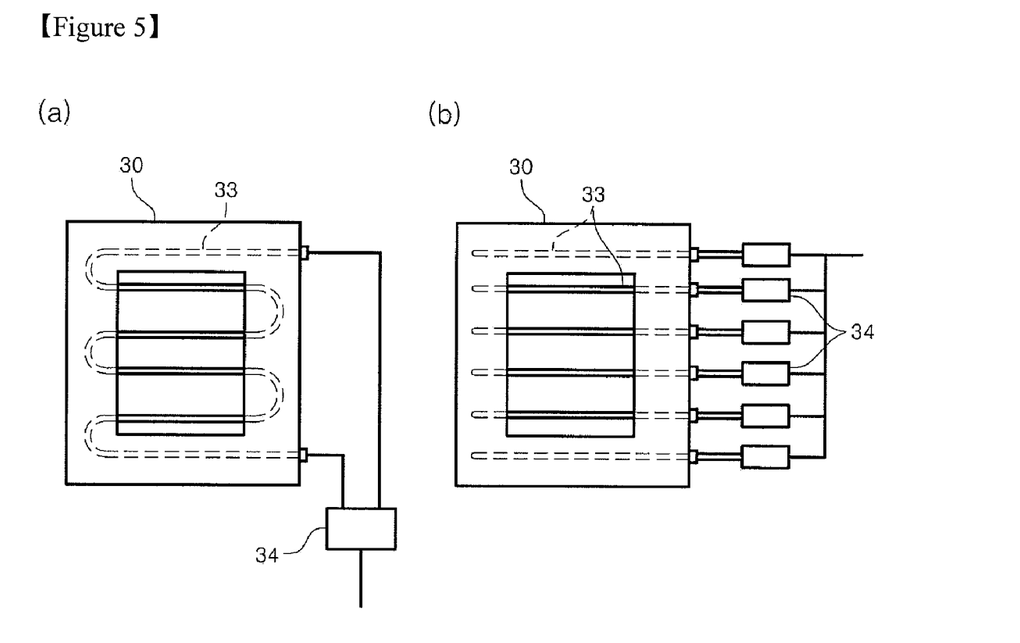

FIG. 1 is a block diagram schematically showing an injection molding apparatus according to an embodiment of the present invention, FIG. 2 is a schematic view showing an open state of the molds of the injection molding apparatus according to an embodiment of the present invention, FIG. 3 is a schematic view showing a closed state of the molds of the injection molding apparatus according to an embodiment of the present invention, FIG. 4 is a detailed view showing an electric heater of an intermediate core mold plate according to an embodiment of the present invention, FIG. 5(a) is a schematic view showing an arrangement of the electric heater of the intermediate core mold plate according to an embodiment of the present invention, and FIG. 5(b) is a schematic view showing another arrangement of the electric heater of the intermediate core mold plate according to an embodiment of the present invention.

The injection molding apparatus of an embodiment of the present invention comprises a cavity mold having a cavity surface, a core mold which is engaged with the cavity mold and is divided into an intermediate core mold plate and a core mold support plate, an injection controller for controlling a hydraulic cylinder which allows the core mold to move forward or backward, a first heating means for heating the intermediate core mold plate, a first cooling means for cooling the core mold support plate, a mold temperature controller for controlling the operation of the first heating and cooling means, and a heat transfer member which is installed on a surface of the core mold support plate facing the intermediate core mold plate.

As shown in FIG. 1, an injection unit is a unit for injecting a material into a cavity, and includes a heating cylinder 122, a screw 124 installed within the heating cylinder 122, and a hydraulic motor 120 for rotating the screw 124. In addition, a hydraulic cylinder 110 is provided to move a core mold fixing plate 50. Further, a cavity mold 20 is fixed to a cavity mold fixing plate 10, and a molten material is injected into the cavity through an injecting passage formed in the cavity mold fixing plate 10 which the heating cylinder 122 comes into close contact with upon injection of material. The screw 124 is installed within the heating cylinder 122 in a longitudinal direction of the heating cylinder 122, and the hydraulic motor 120 which is connected to the screw 124 to rotate the screw 124 is installed to one side of the heating cylinder 122. In addition, the injection controller 310 is electrically connected to the hydraulic cylinder 110, the hydraulic motor 120 and the mold temperature controller 320. Further, the mold temperature controller 320 is electrically connected with a valve 322 for regulating the flow of coolant flowing through a coolant pipe 43 installed to the core mold support plate 30, an electric heater 33 installed to the intermediate core mold plate 30, and a temperature sensor 80 installed to the intermediate core mold plate 30.

Referring to FIG. 2, the cavity mold 20 is formed with a cavity surface 21 in which a molten injection material is injected and the molten injection material is injected in the cavity surface 21 through an injection passage 23. In addition, the cavity mold 20 is formed with guide holes 22 into which the guide pins 41 are inserted. A core surface 31 is formed on a side of the intermediate core mold plate 30 facing the cavity surface 21. Referring to FIG. 3 showing a state where the cavity mold 20 and the intermediate core mold plate 30 are engaged with each other, the core surface 31 and the cavity surface 21 define a cavity C in which the molten injection material is injected. The intermediate core mold plate 30 is shaped as a plate thinner than the core mold support plate 40 to allow the core mold to be easily heated and cooled.

Referring to FIG. 4, a plurality of grooves 37 are formed in a parting surface of the intermediate core mold plate 30, and electric heaters 33 for heating the intermediate core mold plate 30 are inserted in the grooves 37. Here, each of the electric heaters 33 is configured in such a manner that an insulation coating 33b surrounds a heating wire 33a such as a nichrome wire. Further, in order to increase a contact area between the intermediate core mold plate 30 and the core mold support plate 40 and also facilitate heat transfer, a copper member 36 is filled in a space between the electric heater 33 and the groove 37 in which the electric heater 33 is inserted.

Referring to FIGS. 5(a) and (b), a single heating wire (FIG. 5(a)) or a plurality of heating wires (FIG. 5(b)) may be employed in the electric heater 33. Reference numeral 34 designates a mold temperature controller for adjusting an amount of heat from the electric heater 33. In a case where a number of the heating wires are used, an amount of heat from the respective electric heaters 33 can be suitably adjusted such that the temperature of the core surface 31 of the intermediate core mold plate 30 can be uniform. In addition, a temperature sensor 80 is installed to the intermediate core mold plate 30. The temperature sensor 80 is used to measure the temperature of the intermediate core mold plate 30 in real time and to transmit the measured temperature such that the mold temperature controller 34 can suitably adjust the amount of heat from the electric heater to cause the core mold plate to be maintained within a certain range of temperature. Although it has been illustrated in this embodiment that a single temperature sensor is used, a plurality of temperature sensors may be installed, if necessary. Particularly, if the amounts of heat from the respective electric heaters are to be adjusted such that respective regions on the mold surface have different temperatures from one another, it is preferred that the temperature sensors be installed to the desired regions on the core surface where different temperatures are set.

In addition, a first cooling means is installed to the core mold support plate 40 to keep the core mold support plate 40 at a certain temperature such that the intermediate core mold plate 30 can be cooled when the core mold support plate 40 comes into contact with the intermediate core mold plate 30. In this embodiment, the first cooling means includes a coolant tank (not shown), a pump for circulating coolant, and a coolant pipe 43 formed in the core mold support plate 40. The coolant pipe 43 is connected in the core mold support plate 40 and inlet and outlet ports (not shown) are formed in sides of the core mold support plate 40.

Further, coil springs 90 are inserted around the guide pins 41 between the intermediate core mold plate 30 and the core mold support plate 40. When the core mold support plate 40 moves backward to open the cavity, the coil springs 90 allow the intermediate core mold plate 30 and the core mold support plate 40 to be separated from each other by means of their elastic force such that the intermediate core mold plate 30 can be rapidly heated by means of the electric heaters 33 in a state where the intermediate core mold plate 30 is not further cooled by means of the core mold support plate 40. In particular, as shown in FIG. 3, after a molten material has been injected into the cavity C formed by bringing the intermediate core mold plate 30 into close contact with the cavity mold 20, the parting surfaces of the intermediate core mold plate 30 and the core mold support plate 40 are preferably brought into close contact with each other to improve the cooling effect of the intermediate core mold plate 30. Thus, each of the coil springs 90 is inserted around the guide pin 41. As shown in FIG. 3, when the core mold support plate 40 is moved to come into contact with the intermediate core mold plate 30, the coil springs 90 are completely inserted into circular holes 44 each having a constant depth and formed at outer peripheral regions of the core mold support plate to which the guide pins 41 are fixed.

A heat transfer member 94 is installed to a surface of the intermediate core mold plate 30 facing the core mold support plate 40 in order to rapidly cool the intermediate core mold plate 30 which has been heated during the injection process. Alternatively, the heat transfer member 94 may be installed to a surface of the core mold supporting plate 40 facing the intermediate core mold plate 30. Such a heat transfer member 94 is made of soft metal with hardness less than the core mold, and the soft metal is preferably a metal selected from gold, silver, copper, tin, lead and aluminum, or an alloy thereof. In addition, the heat transfer member 94 is a gel-state heat transfer material having a dissolution temperature of 180° C. or above. Preferably, the heat transfer material is lubricating grease.

The injection controller 310 controls the hydraulic cylinder 110 for moving the core mold forward or backward, and the hydraulic motor 120 for rotating the screw 124. In addition, the mold temperature controller 320 receives a signal from the temperature sensor 80 installed to the intermediate core mold plate 30 and controls the electric heater 33 serving as the first heating means and the valve 322 installed to the coolant pipe 43 serving as the first cooling means, thereby regulating the coolant flow. Of course, the injection controller 310 and the mold temperature controller 320 can transmit and receive necessary signals to and from each other.

Figure 6:
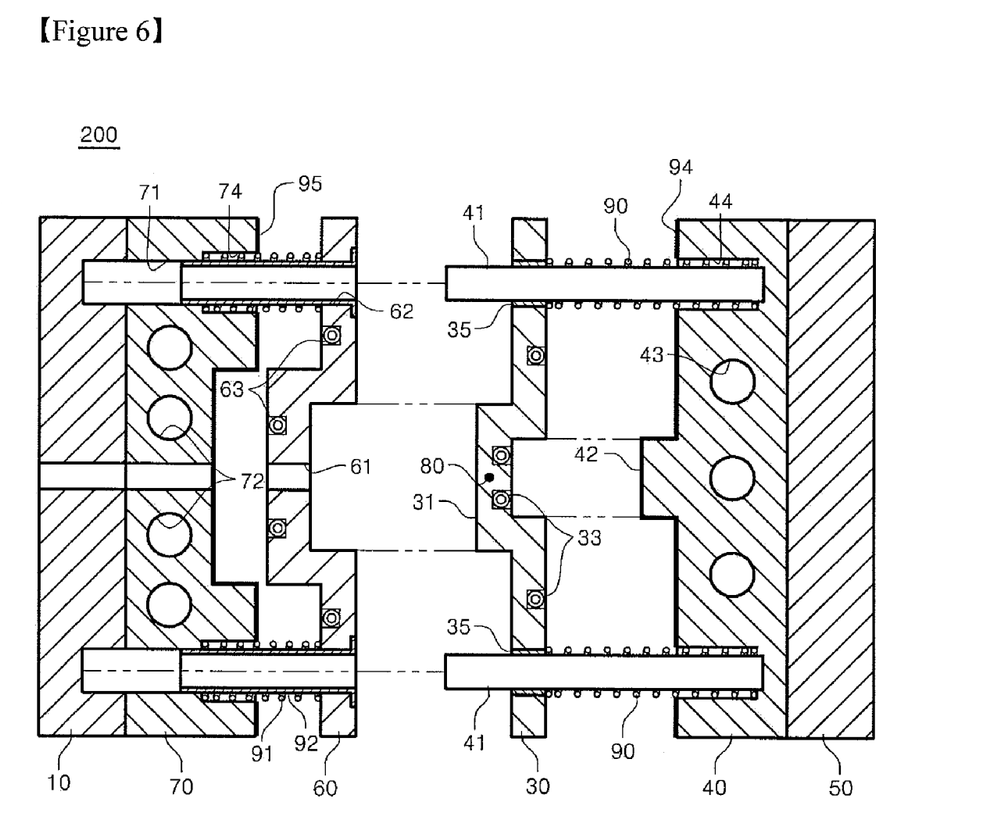
FIG. 6 is a schematic view showing an open state of the molds of an injection molding apparatus according to another embodiment of the present invention.

Hereinafter, an injection molding apparatus according to an embodiment of the present invention will be described with reference to the accompanying drawings. FIG. 6 is a schematic view showing an open state of the molds of an injection molding apparatus according to an embodiment of the present invention, and FIG. 7 is a schematic view showing a closed state of the molds of the injection molding apparatus according to an embodiment of the present invention.

This embodiment is different from the previous embodiment in that the cavity mold 20 is also divided into an intermediate cavity mold plate 60 and a cavity mold support plate 70 in the same manner as the core mold, and that electric heaters are installed to a parting surface of the intermediate cavity mold plate 60 and cooling pipes are formed in the cavity mold support plate 70. The molding apparatus of this embodiment further includes hollow guide cylinders 92 each of which has one end fixed through the intermediate cavity mold plate 60 and the other end fitted into a second guide hole 71 formed in the cavity mold support plate 70 such that the intermediate cavity mold plate 60 can be moved in one direction with respect to the cavity mold support plate 70. In addition, as shown in FIG. 6, coil springs 91 are inserted into the guide cylinders 92 such that the intermediate cavity mold plate 60 can be disengaged from the cavity mold support plate 70 when the intermediate cavity mold plate 60 and the intermediate core mold plate 30 are in an open state. Further, another heat transfer member 95 is installed to a surface of the intermediate cavity mold plate facing the cavity mold support plate. The heat transfer member 95 is positioned between the cavity mold support plate and the intermediate cavity mold plate to rapidly cool the heated intermediate cavity mold plate. Alternatively, the heat transfer member may be installed to a surface of the cavity mold support plate facing the intermediate cavity mold plate.

Figure 7:
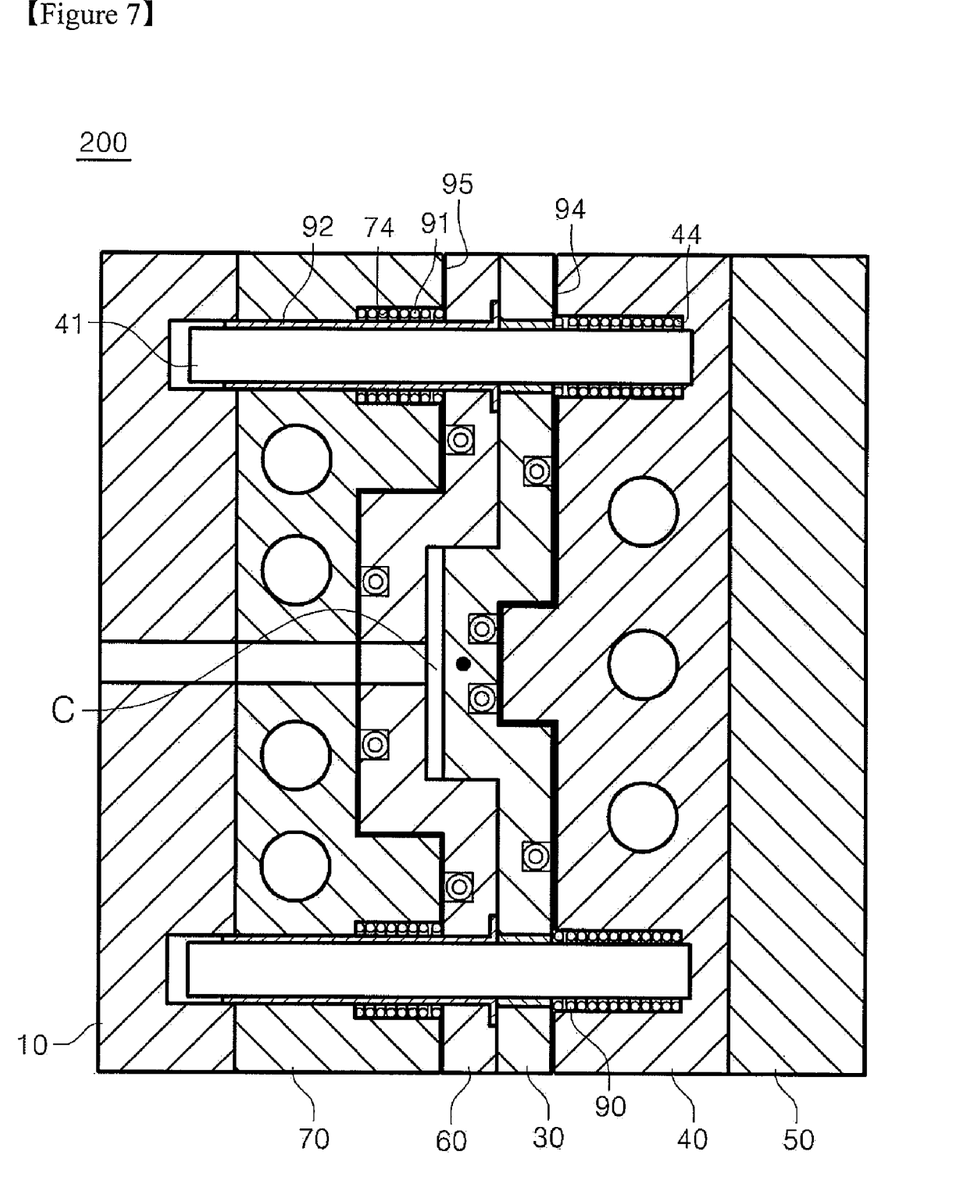
FIG. 7 is a schematic view showing a closed state of the molds of the injection molding apparatus according to another embodiment of the present invention.

Referring to FIG. 7, large-diameter portions 74 are formed in series with the second guide holes 71 in which the guide cylinders 92 are inserted such that the second springs 91 are inserted therein to completely bring the intermediate cavity mold plate 60 and the cavity mold support plate 70 into close contact with each other, in the same manner as the circular holes 44 are formed on the core mold support plate 40 at positions where the guide pins 41 are fixed such that the core mold support plate 40 can be brought into close contact with the intermediate core mold plate 30. Although an eject pin for removing an injection-molded product from the molding apparatus is not illustrated in this embodiment, an eject pin is installed to eject a product molded through the intermediate cavity or core mold plates from the molding apparatus in a case where the product is not automatically ejected from the molding apparatus.

Figure 8:
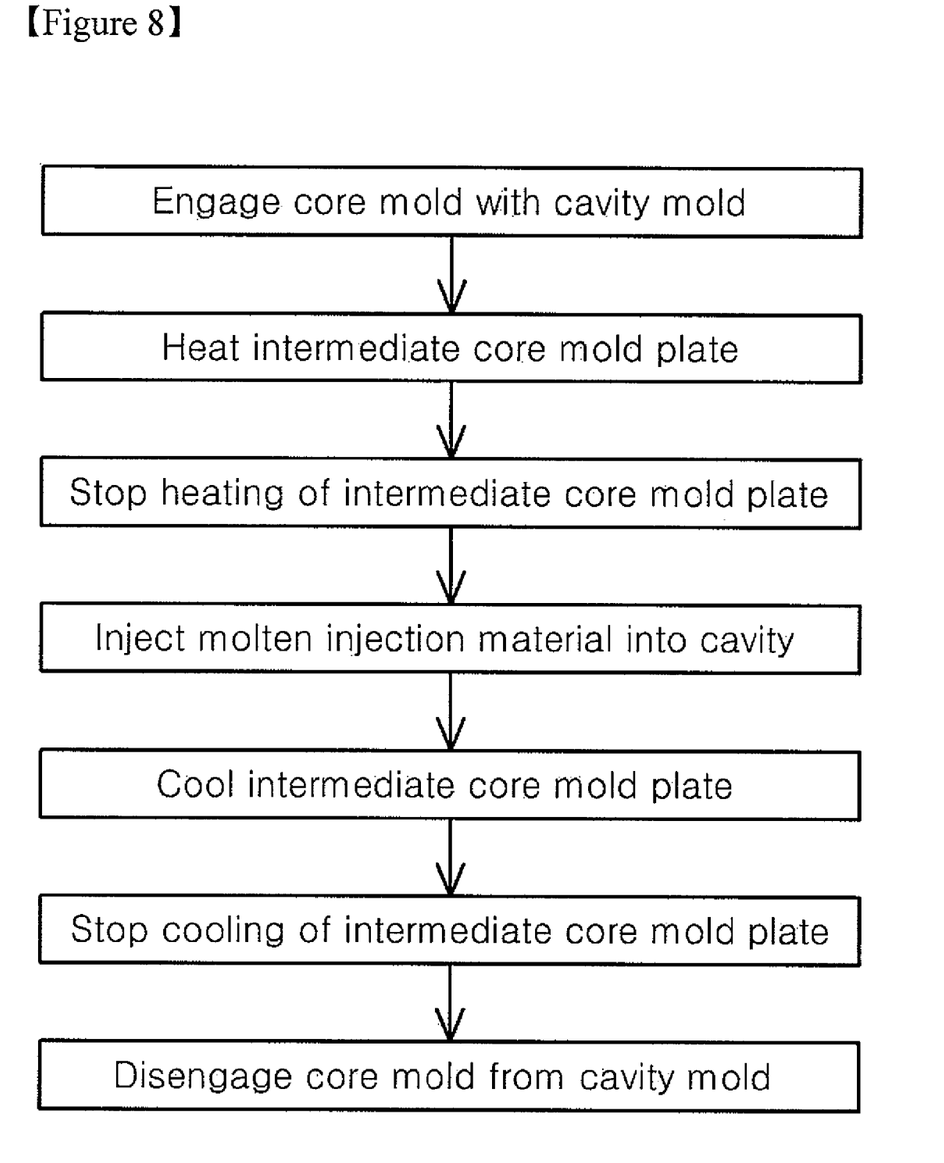
FIG. 8 is a flowchart illustrating a method of controlling the injection molding apparatus according to an embodiment of the present invention.

Hereinafter, a method of controlling the injection molding apparatus according to an embodiment of the invention will be described with reference to the accompanying drawings. FIG. 8 is a flowchart illustrating a method of controlling the injection molding apparatus according to an embodiment of the present invention. First, when a signal indicating that the molds are opened is input to the injection controller 310, the injection controller 310 operates the hydraulic cylinder 110 such that the core mold can be engaged with the cavity mold 40. At the same time, the signal is also input to the mold temperature controller 320, and the mold temperature controller 320 operates the electric heater 33 serving as the first heating means to heat the intermediate core mold plate 30.

As the intermediate core mold plate 30 is heated, a signal detected from the temperature sensor 80 installed to the intermediate core mold plate 30 is sent to the mold temperature controller 320, which in turn terminates the operation of the electric heater 33 to stop the heating of the intermediate core mold plate 30 when the temperature sent to the mold temperature controller 320 reaches a predetermined heating temperature. Simultaneously, when the operation of the electric heater 33 is stopped, the hydraulic motor 120 is operated to allow a molten material in the heating housing 122 to be injected into the cavity through the injection passage 23 by means of the screw 124.

At the same time, the core mold support plate 40 mounted with the coolant pipe 43 is brought into close contact with the intermediate core mold plate 30 in order to cool the intermediate core mold plate 30. Here, the reason that the intermediate core mold plate 30 is cooled simultaneously when the injection material is injected into the cavity is that the time taken to inject the molten material into the cavity is relatively shorter than the time taken to cool the intermediate core mold plate 30.

Then, a signal detected from the temperature sensor 80 installed to the intermediate core mold plate 30 is input to the mold temperature controller 320, which in turn allows the intermediate core mold plate 30 to be separated from the core mold support plate 40 in order to stop the cooling of the intermediate core mold plate 30 when the temperature input to the mold temperature controller 320 reaches a predetermined cooling temperature.

If the cooling of the intermediate core mold plate 30 is stopped, the injection controller 310 operates the hydraulic cylinder 110 such that the core mold is disengaged from the cavity mold 40. In addition, an ejector pin (not shown) is operated to remove the molded product from the molding apparatus, if desired. According to an embodiment of the present invention, a molding apparatus includes separate intermediate core and cavity mold plates. The separate intermediate core and cavity mold plates are heated to a suitable temperature using the electric heaters before the injection molding and then rapidly cooled by means of the previously cooled separate core and cavity mold support plates. Therefore, an embodiment of the present invention can provide a molding apparatus having excellent flowability and transferability and high productivity due to the shortened cycle time for the injection molding, and a controlling method thereof. In particular, since a plurality of electric heaters are used to allow respective regions on the mold surface to be kept at the different temperatures, a cooling rate of the product can be controlled to prevent the product from being deformed due to the residual stress. Further, since the cycle time for the injection molding can be shortened, a molding apparatus with high productivity and a controlling method thereof can be obtained.

In addition, the injection molding apparatus according to an embodiment of the present invention is configured such that the injection controller controls the hydraulic cylinder for causing the core mold to move forward or backward and the mold temperature controllers control the temperature of the intermediate core mold. Therefore, since the injection molding work is automated, the number of workers can be reduced and the productivity can also be improved.

Embodiments described above and illustrated in the drawings should not be construed as limiting a technical spirit of the present invention. The scope of the present invention is defined only by the appended claims, and various changes and modifications may be made within the spirit and scope of the invention by those skilled in the art. Thus, such changes and modifications will be included in the scope of the present invention.

What is claimed is:

1. An apparatus for injection molding, the apparatus comprising:
    a first mold comprising a first cavity surface; and
    a second mold comprising:
        a heating plate comprising a second cavity surface opposing the first cavity surface, wherein the first and second cavity surfaces in combination are configured to define a molding cavity with or without an additional surface,
        a cooling plate movable relative to the heating plate between a first position and a second position, and
        a heat-transfer enhancing layer integrated with either of the heating plate and the cooling plate so as to be interposed between the heating plate and the cooling plate, wherein the heat-transfer enhancing layer is formed of a material other than that of a portion of the cooling plate or the heating plate with which the heat-transfer enhancing layer is integrated, wherein the heat-transfer enhancing layer contacts both the heating plate and the cooling plate when the cooling plate is in the first position.

2. The apparatus of claim 1, wherein the heat-transfer enhancing layer is integrated with the cooling plate, wherein the heat-transfer enhancing layer comprises a surface facing the heating plate, wherein the surface contacts the heating plate when the cooling plate is in the first position, while not contacting the heating plate when the cooling plate is in the second position.

3. The apparatus of claim 1, wherein the heat-transfer enhancing layer is integrated with the heating plate, wherein the heat-transfer enhancing layer comprises a surface facing the cooling plate, wherein the surface contacts the cooling plate when the cooling plate is in the first position, while not contacting the cooling plate when the cooling plate is in the second position.

4. The apparatus of claim 1, wherein the material of the heat-transfer enhancing layer is softer than that of the material of the portion of the heating plate or the cooling plate.

5. The apparatus of claim 1, wherein the heat-transfer enhancing layer comprises at least one metal selected from the group consisting of gold, silver, copper, tin, lead and aluminum.

6. The apparatus of claim 1, wherein the heat-transfer enhancing layer comprises a grease layer coated on a surface of the cooling plate.

7. The apparatus of claim 1, wherein the heat-transfer enhancing layer comprises a grease layer coated on a surface of the heating plate.

8. The apparatus of claim 1, wherein the heating plate further comprises an electric heater embedded therein.

9. The apparatus of claim 1, wherein the first mold is movable relative to the cooling plate and further movable relative to the heating plate.

10. The apparatus of claim 1, wherein the first mold comprises a passage configured to flow a moldable material toward the cavity.

11. The apparatus of claim 1, wherein the first mold comprises:
    a second heating plate comprising the first cavity surface,
    a second cooling plate movable relative to the first heating plate between a third position and a fourth position, and
    a second heat-transfer enhancing layer integrated with either of the second heating plate and the second cooling plate so as to be interposed between the second heating plate and the second cooling plate, wherein the second heat-transfer enhancing layer is formed of a material other than that of a portion of the second cooling plate or the second heating plate with which the second heat-transfer enhancing layer is integrated, wherein the second heat-transfer enhancing layer contacts both the second heating plate and the second cooling plate when the second cooling plate is in the third position.

12. A method of injection molding, the method comprising:

providing the injection molding apparatus of claim 1;

moving the heating plate relative to the first mold so as to form the molding cavity between the first and second cavity surfaces with or without an additional surface;

generating heat in the heating plate;

injecting a moldable material into the molding cavity;

moving the cooling plate relative to the heating plate such that the heat-transfer enhancing layer contacts the other of the heating plate and the cooling plate, thereby improving a heat-transfer contact between the heating plate and the cooling plate; and cooling the cooling plate so as to enhance heat-transfer from the heating plate to the cooling plate.

13. The method of claim 12, wherein the heat-transfer enhancing layer is integrated with the cooling plate.

14. The method of claim 12, wherein the heat-transfer enhancing layer is integrated with the heating plate.

15. The method of claim 12, wherein the material of the heat-transfer enhancing layer is softer than that of the material of the portion of the heating plate or the cooling plate.

16. The method of claim 12, wherein the heat-transfer enhancing layer comprises at least one metal selected from the group consisting of gold, silver, copper, tin, lead and aluminum.

17. The method of claim 12, wherein the heat-transfer enhancing layer comprises a grease layer coated on a surface of the cooling plate.

18. The method of claim 12, wherein the heat-transfer enhancing layer comprises a grease layer coated on a surface of the heating plate.

19. The method of claim 12, further comprising moving the cooling plate away from the heating plate after injecting the moldable material.

20. The method of claim 12, wherein the heating plate comprises an electrical heater embedded therein.

21. The apparatus of claim 1, wherein the cooling plate comprises a surface facing the heating plate, and wherein the heat-transfer enhancing layer covers throughout the surface of the cooling plate when the heat-transfer enhancing layer contacts the cooling plate.

* * * * *